United States Patent [19]

Preis et al.

[11] Patent Number: 5,047,104
[45] Date of Patent: Sep. 10, 1991

[54] PROFILES OF COMPOSITE FIBROUS MATERIALS

[75] Inventors: Lothar Preis; Rolf Förster, both of Cologne, Fed. Rep. of Germany

[73] Assignee: Bayer Aktiengesellschaft, Fed. Rep. of Germany

[21] Appl. No.: 909,603

[22] Filed: Sep. 22, 1986

Related U.S. Application Data

[63] Continuation of Ser. No. 485,302, Feb. 15, 1983, abandoned, which is a continuation of Ser. No. 83,593, Oct. 11, 1979, abandoned, which is a continuation of Ser. No. 929,924, Aug. 1, 1978, abandoned.

[30] Foreign Application Priority Data

Aug. 6, 1977 [DE] Fed. Rep. of Germany ....... 2735538

[51] Int. Cl.$^5$ .................... B32B 31/12; B32B 35/00
[52] U.S. Cl. ...................... 156/86; 156/149; 156/161; 156/165; 156/172
[58] Field of Search ............... 264/137, 230, 103, 289, 264/339, 174; 156/180, 149, 161, 165, 162, 172, 433, 441, 86, 85; 428/375, 377, 378

[56] References Cited

U.S. PATENT DOCUMENTS

| | | | |
|---|---|---|---|
| 2,652,093 | 9/1953 | Burton | 156/86 |
| 2,953,418 | 9/1960 | Runton et al. | 156/86 |
| 3,033,729 | 5/1962 | Shobert | 156/180 |
| 3,223,565 | 12/1965 | Fritz et al. | 156/86 |
| 3,296,047 | 1/1967 | Parr | 156/86 |
| 3,560,065 | 2/1971 | Shobert et al. | 156/180 |
| 3,650,864 | 3/1972 | Soldsworthy | 156/85 |

*Primary Examiner*—Jenna Davis
*Attorney, Agent, or Firm*—Connolly & Hutz

[57] ABSTRACT

A process for the production of profiles from composite fibrous materials, wherein the strands of fibrous materials continuously impregnated with liquid reaction resins are wrapped or braided immediately after impregnation or in a prehardening zone with drawn and/or preoriented and/or textured organic fibres or monofils or mixtures of organic and inorganic fibres or monofils and are hardened in a following hardening zone.

11 Claims, 1 Drawing Sheet

PROFILES OF COMPOSITE FIBROUS MATERIALS

CROSS REFERENCE TO RELATED APPLICATIONS

This application is a continuation of application Ser. No. 485,302, filed Feb. 15, 1983 and now abandoned which in turn is a continuation of application Ser. No. 83,593, filed Oct. 11, 1979 and now abandoned which in turn is a continuation of application Ser. No. 929,924, filed Aug. 1, 1978 and now abandoned.

There are several known processes for the continuous production of profiles from composite fibrous materials. In all these processes, semifinished products of organic, inorganic or metallic fibres in the form of strands, webs or cloths are run off from a supply stand, impregnated with a liquid reaction resin and hardened in a hardening zone where they are also shaped in dies to form profiles.

The various known processes differ from one another in the type of impregnations and also in the shaping and hardening steps. The shaping step is normally carried out in dies of high-quality tool steels which are heated with steam, oil or by electricity and have sliding surfaces which are frequently provided with treated, for example hardchrome-plated, surface layers for reducing friction and wear. Relatively complicated profiles can be produced with dies of this kind. It has been found in practice that the use of dies as complex as these necessitates very careful matching of all the components of the system. There are several reaction resins which, for example, due to their reactivity or due to the friction conditions, cannot be used in view of the considerable die lengths required for exact shaping, despite the use of release agents.

The intense frictional forces occurring in the dies limit the fibre content of the composite fibrous materials, disturb the orientation of the fibres and necessitate the application of strong take-off forces. Although reducing friction by using Teflon dies, for example, affords advantages in that it minimises friction and enables the reaction resins to be subjected to microwave hardening, it is attended by serious disadvantages in that the service lives of the dies are very short by comparison with steel dies.

In order to obviate the above mentioned disadvantages in cases where steel dies are used, at least in the case of simple circular or elliptical cross-sections, it has also been proposed to wrap the impregnated fibrous material in separating film. In this way, hardening can be carried out without further shaping in a following, simple hardening zone. Disadvantages of this process include the expense and effort involved in wrapping and unwrapping the separating films, which generally cannot be repeatedly used, and the unsatisfactory surfaces which, in many cases, require finishing.

It is also possible to produce simple profiles without additional shaping by wrapping and impregnating strands in glass fibre products. Disadvantages of this process include the poor surfaces of the profiles and the appearance of hardening cracks, even with relatively small cross-sections.

The present invention provides a process for the production of profiles from composite fibrous materials which is characterised in that strands of fibrous materials continuously impregnated with liquid reaction resins are wrapped or braided immediately after impregnation or in the vicinity of a prehardening zone in drawn and/or preoriented and/or textured organic fibres or monofils or mixtures of organic and inorganic fibres or monofils and are hardened in a following hardening zone.

In the process according to the invention, fibrous materials are impregnated with a liquid resin in conventional manner, for example in an impregnating bath, the resin content being adjusted by nozzles, rollers or similar means known from the prior art.

The wrapping of the impregnated fibrous material in fibrous materials suitable for this purpose in accordance with the present invention may be carried out immediately after the fibre strands have left the impregnating bath. In some cases, it is even advantageous to carry out the wrapping step after a prehardening process, but with the reaction resin still in the liquid phase.

The actual hardening process is carried out in conventional manner, for example by convection heating, by radiant heating or by microwaves in a heating duct.

The wrapping of the impregnated fibrous materials in drawn or preoriented or textured organic fibres may be carried out in conventional lapping machines, for example diagonal lapping machines of the type used for reinforcing hoses, or in machines of the type used for producing insulations by lapping or braiding. Machines for wrapping wires (for example guitar strings) are also suitable.

The impregnated fibrous material may be wrapped in the form of peripheral laps of low pitch. Helical wraps having pitch angles variable within wide limits are also possible. Another form of wrapping is to apply diagonal (cross) laps. It is also possible to use conventional braiding processes for applying the organic fibres to the impregnated fibre strands.

In applying helical laps, cross-laps or braided laps, the impregnated fibre materials may be covered with several thicknesses of the drawn or preoriented or textured organic fibres, depending upon the desired properties (effects).

The important feature of the process according to the invention is that, by wrapping the impregnated fibrous materials in drawn or preoriented or textured organic fibres as opposed to inorganic fibres, it is possible to produce profiles with exact circular cross-sections without any need to use a shaping unit, for example a die. Other geometrically simple and exact cross-sectional forms (for example ellipses) can be obtained by wrapping impregnated fibrous materials in organic fibres providing the strand issuing from the impregnating bath has, for example, a substantially rectangular cross-section.

In addition to the possibility of producing profiles having geometrically satisfactory cross-sections without any need to use dies, it is possible by wrapping impregnated strands of fibrous materials in drawn and/or preoriented and/or textured organic fibres, to produce closed hollow profiles on an internal former, i.e. without any need for an external former. Another possible method of producing profiles is characterised in that, by wrapping a flat impregnated strand of fibrous material in drawn and/or preoriented and/or textured organic fibres, flat profiles or angular profiles may readily be produced simply by using calibrating rollers.

Since the use of dies is not required, hardening can be carried out with particular advantage by microwave heating because the impregnated fibre strands are capable of absorbing the radiation at full strength over fairly considerable distances.

Particularly interesting possibilities arise out of the fact that, in addition to drawn and/or preoriented and/or textured organic fibres for wrapping the impregnated fibrous materials, it is also possible to apply inorganic fibres as additional reinforcements or fibres mixtures of organic and inorganic fibres for additionally reinforcing the composite fibrous material. In addition to the uniform application of the wrapping, the effect obtained by wrapping the impregnated fibrous materials in drawn and/or preoriented and/or textured organic fibres or monofils is attributable, in particular, to the fact that the prehardening process and/or the hardening process is accompanied by the liberation of shrinkage forces which are determined by the proportion, nature, degree of drawing and/or preorientation and/or texturing and by the geometric arrangement of the organic fibres. The organic fibres are so selected that the shrinkage forces are still active before the reaction resin used reaches the gel phase. The shrinkage forces released are determined not only by the type of fibrous material used, but also by the proportion (coverage), the degree of drawing and/or preorientation and the geometric arrangement of the organic fibres on the profile to be wrapped. For the above-mentioned examples of shaping, it has been found that even a relatively low coverage of around 12% is sufficient for obtaining the described effects.

At the same time, a resin-rich profile surface is always obtained as a result of the shrinkage forces. Providing the nature, quantity and arrangement of the organic fibrous material are appropriately selected, the profiles obtained are completely surrounded by a layer of pure resin which, in other processes, can only be obtained by inclusion of an additional process step.

One of the advantages of such a resin covering produced in a single process step is that it improves handling without any need for troublesome reinforcing fibres on the surface of the profile. This in turn provides for a considerably improved weather resistance which normally can only be obtained by an additional coating with the attendant problems of adhesion.

The shrinkage forces of the organic fibres may also be effectively utilised for obtaining high fibre contents for an almost ideal longitudinal orientation of the reinforcing fibres and also for obtaining profiles free from air bubbles which are characterised by a substantially uniform distribution of fibres. This in turn provides for significant increases in the modulus and strength values of the profile accompanied by a distinct improvement in the reproducibility of these values. Fibre contents, strength values and orientations such as these cannot be obtained in processes with external shaping on account of the frictional forces occurring.

By wrapping impregnated fibrous materials in organic fibres, it is possible in the case of predominantly unidirectionally reinforced profiles to obtain a distinct improvement in strength transversely of the longitudinal axis of the profile (transverse strength). It is also possible by wrapping impregnated fibrous materials in organic fibres considerably to reduce the so-called notch sensitivity of the profiles so produced.

Specific and, in general, considerable improvements in the stiffness both in flexure and torsion of symmetrical profiles of any kind can be obtained by wrapping impregnated fibrous materials both in suitable organic fibres and also in predominantly inorganic fibres. In this way, the advantage of impregnating the fibres additionally applied without a further impregnating bath, i.e. solely by the shrinkage of the organic fibres, is accompanied by the advantage of the increase in stiffness. Wrapping of the impregnated fibrous materials in fibres of both types may be carried out in separate process steps, although it is carried out with particular advantage in a single process step.

The process according to the present invention also enables several individual strands to be impregnated with different impregnating resins, to be joined together by wrapping and to be hardened to form a single composite fibrous material. In this case, a single composite fibrous material is obtained by virtue of the fact that the shrinkage forces released during hardening join the individual fibre strands to form a profile with a homogeneous distribution of fibres, but with different matrix materials.

As already described, the excess of resin produced on the surface of the profile by the shrinkage forces of the drawn or preoriented and/or textured organic fibres may be used for completely impregnating further fibrous materials. In this way, it is also possible for example to produce decorative profiles by using differently coloured fibrous materials, and also profiled surfaces.

In addition, the excess of resin may be controlled through the nature, proportion, degree of drawing and geometric orientation of the organic fibres so that additionally applied materials are only partly impregnated.

Where the profiles are additionally wrapped in organic fibres, the non-impregnated or only incompletely impregnated fibres lying on the surface of the profile afford simple possibilities of obtaining an improvement in adhesion, for example where the profiles are embedded in thermoplastics. To this end, the wrapping material selected is as close as possible in type to the thermoplast used. Where the profiles are additionally wrapped in inorganic fibres, for example glass fibres, the described effects provide for particularly favourable conditions for the introduction of tensile forces, for example in force-initiating elements, through the enlarged surface of the profile which is obtained by profiling and also with incompletely impregnated fibres.

Materials

The process according to the invention is suitable for composite fibrous materials of glass fibres, organic fibres, carbon fibres and metal fibres. The fibres may be present, for example, in the form of fibre strands such as yarns, filament yarns, twisted yarns, roving and spun filaments, and the like, or in the form of woven textiles and/or fibrous mats.

Suitable matrix materials are, for example, reaction resins such as unsaturated polyester resins, epoxide resins, methacrylate resins, polyurethane resins, novolak resins, poly-bis-maleic imides or even cyanate resins of which the heat effect during the hardening process or their hardening temperatures exceed levels at which the organic fibres used shrink.

Suitable materials for wrapping and impregnated fibrous materials are drawn and/or preoriented and/or textured organic fibres or monofils of polyamides, thermoplastic polyesters, polycarbonates, polyacrylonitrile, modacrylics, polyolefins, polyvinyl chloride, polytetrafluoroethylene, cellulose and regenerated cellulose, cellulose esters or polyvinyl alcohol and also polyurethane fibres.

The shrinkage temperature of the organic fibres depends upon the starting polymer and upon the conditions applied during the production, drawing and/or texturing of the fibres. As already mentioned, the choice of a suitable organic fibre must be made according to the hardening conditions of the matrix material used.

By virtue of their homogeneous fibre arrangement, their high fibre contents and their freedom from vacuoles and other faults and also by virtue of their resin-rich or pure-resin surfaces, combined with their strength values, profiles produced by the process according to the invention are suitable for use as prestressing wires or cables for reinforcing concrete, the improved possibilities for initiating forces, the reduced notch sensitivity and the increased transverse strength of predominantly unidirectionally reinforced profiles being of particular advantage in this respect. The high weather resistance of the profiles attributable to their pure resin surface is of particular advantage for open-air applications.

High strength values combined with favourable electrical properties also enable profiles produced by the process according to the invention to be used in the electrical field, for example as high-strength supports in insulators or for the suspension of contact wires and in the construction of electrical machinery.

BRIEF DESCRIPTION OF THE DRAWINGS

Novel features and advantages of the present invention will become apparent to one skilled in the art from a reading of the following in conjunction with the accompanying drawings wherein similar reference characters refer to similar parts and in which.

EXAMPLE 1

In the production of a round bar from glass rollings and polyester resin, which was only drawn through a satisfactory, round die 10 mm in diameter for adjusting the resin content at the output end of the impregnating bath and which was subsequently hardened in an electrically heated tubular furnace without any further shaping, it was found that the bar was irregularly shaped and had a rough surface with some exposed glass fibres. The deviations from the ideal circular form amounted to as much as 10%. The bar had a glass content of 76.4% by weight.

EXAMPLE 2

Figure 1:
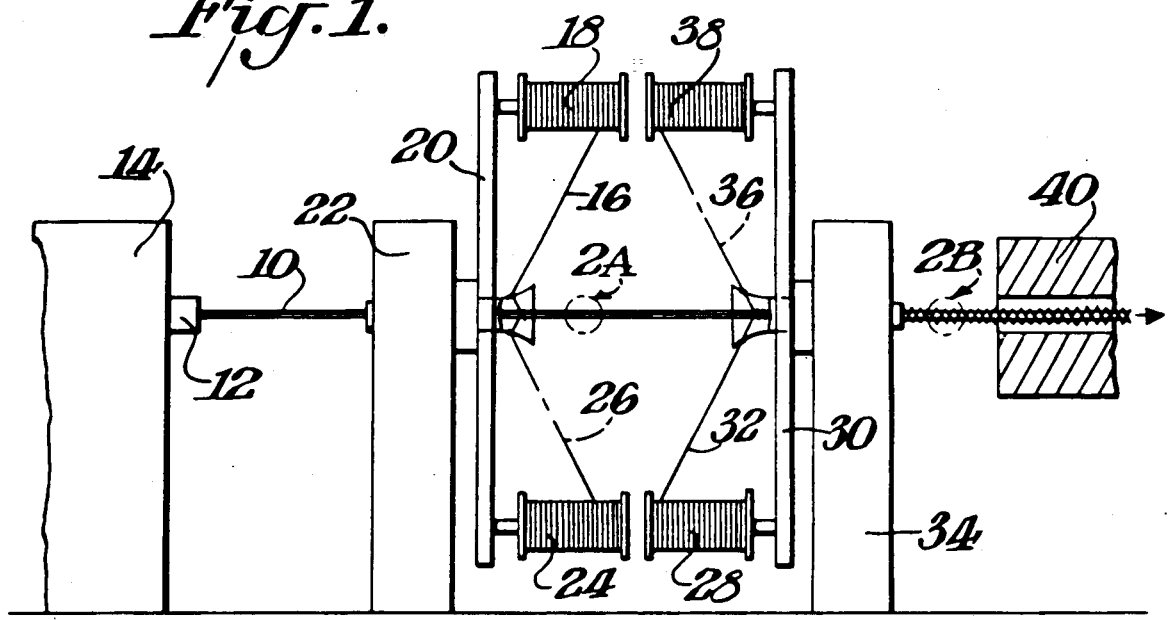
FIG. 1 is a schematic elevational view of apparatus for performing the process of this invention.

FIG. 1 illustrates the process of this example.

Figure 2A:
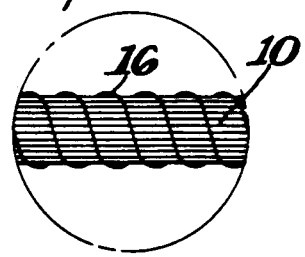
FIG. 2A is an enlargement of the indicated portion of FIG. 1.
Figure 2B:
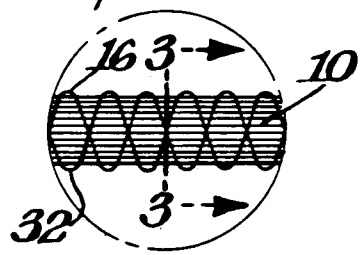
FIG. 2B is another enlargement of the indicated portion of FIG. 1.
Figure 2C:
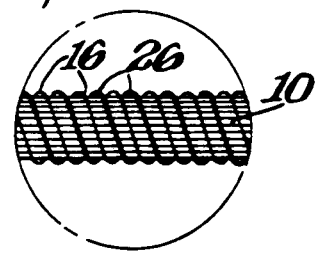
FIG. 2C is a further enlargement of a variation of the portions shown in FIG. 1.
Figure 3:
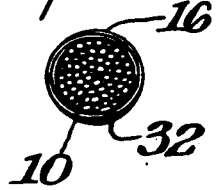
FIG. 3 is a cross-sectional view taken through FIG. 2B along the line 3—3.

After hardening at temperatures of from 140° to 180° C., similarly impregnated glass fibre strands 10 which, after leaving the 10 mm diameter, 5 mm long die 12 at the output end of the impregnating bath 14, were helically wrapped in Perlon filament yarn 16, consisting of 140 individual filaments with an overall denier of 940 dtex and a drawing ratio of 1:3.2, up to a coverage of approximately 20% from one layer of wrapping, shown in FIG. 2A gave round profiles without any longitudinal or transverse cracks showing a deviation of less than 1% from the circular form. Yarn 16 is supplied from a spool 19 on one side of winding head 20 rotated by drive mechanism 22. A second spool 24 can be used to provide a pair of helical windings 16 and 26, as shown in FIG. 2C. When a counter-rotating spool 28 on second winding frame 30 is utilized to wrap thread 32 about impregnated strands 10, a cross-helical winding as shown in FIG. 2B results. Winding head 30 is rotated in the opposite direction from winding head 20 by drive 34. A second unimpregnated strand 36 can be wound in parallel with thread 32 by spool 38 on the opposite side of winding head 30. After being wrapped, strands 10 and its outer wrapping are passed through hardening furnace 40. In FIG. 2C the second unimpregnated strand 26 may be of different material from initial strand 16. After the round bar had been rubbed down to remove projecting organic fibres, it had a glass content of 81.5% by weight. The surface of the bar thus produced was smooth and glossy. The thickness of the pure resin layer on the surface amounted to approximately 100 μm.

EXAMPLE 3

As in Example 1, glass fibre strands were impregnated with polyester resin and, after leaving the impregnating bath with a 10 mm diameter die at its output end, were wrapped equally in E-glass spun filaments with a denier of 3100 dtex and polyester (PETP) filament yarn consisting of 34 individual filaments with an overall denier of 167 dtex and a drawing ratio of 1:4. The covering assumed the form of a single-layer, helical wrapping with a pitch of 15°. After hardening at temperatures of from 160° C., to 195° C., a satisfactory round profile without any longitudinal cracks was obtained. In order to test notch sensitivity and bearing strength perpendicularly of the profile axis and also the tensile strength of the profiles, approximately 15 mm long sections of profile were subjected to notch tests using the punch of a standard bending-strength testing machine (tip radius 1 mm) and to compression tests between two flat plates, the profile axis being arranged perpendicularly of the force direction. Compared with the unwrapped comparison bar, approximately 35% higher breaking loads were obtained in the notch tests. The compression test between flat plates produced values higher on average by 15% in relation to the comparison bar. Tensile tests conducted in accordance with DIN 53 455 using a comparison bar produced approximately 10% higher strength values (approximately 1350 MPas) for the same cross-section by virtue of the fault-free surface and the uniform distribution of fibres over the cross-section of the bar in the wrapped round profile. The well known difficulty of clamping composite fibrous materials with strengths as high as these for test purposes was overcome by casting the round bars into devices of a synthetic resin mortar. It was found that much greater casting lengths had to be adopted for the non-wrapped bars in order to obtain cleavage of the glass fibres.

EXAMPLE 4

As described in Example 1, carbon fibre strands were impregnated in a resin bath and the fibre content was adjusted in a rectangular die measuring 20×2 mm in cross-section. After the bundle of fibres had left the die, the strand was wrapped by crosswinding at ±75° to the longitudinal axis of the bar in Perlon yarn consisting of 18 individual filaments and having an overall denier of 67 dtex (drawing ratio 1:2.8), up to a coverage of approximately 30%, and after passing through a prehardening zone was calibrated through three pairs of rollers, the profile being covered on both sides with siliconised paper, and subsequently hardened. A profile with a smooth surface and rounded edges was obtained. It had fluctuations in thickness of 2% over its length, its surfaces being parallel to one another. The profile was completely free from longitudinal cracks.

EXAMPLE 5

As in the first Example, glass rovings were impregnated in an impregnating bath and the impregnated rovings were adjusted to the required resin content in a circularly arranged multiple die. After leaving the die, the fibre strands were guided over a cylindrical drag core as inner former and, in a prehardening zone, were helically wrapped, still on the drag core, with Perlon monofilaments 0.20 mm in diameter ($\triangleq 400$ dtex) for a drawing ratio of 1:4 in a coverage of approximately 40%. In the following hardening zone (tubular furnace), the profiles were hardened at temperatures of from 140° C. to 160° C. This process which only uses a drag core, i.e. no external former, gives hollow profiles which have a geometrically satisfactory internal diameter with fluctuations in wall thickness of ±0.1 mm for a wall thickness of 2 mm. The surface of the profiles was undulating in the longitudinal direction.

We claim:

1. A process for the production of unidirectionally reinforced bars of circular cross-section from composite fibre materials selected from glass fibres and carbon fibres, comprising the steps of impregnating strands of fibre materials with liquid reaction resins, disposing the impregnated strands in a predetermined preliminary profile, wrapping the disposed impregnated strands in a liquid condition before they harden with unimpregnated strands of shrinkable materials selected from polyamides or polyester fibres or monofils in drawn (stretched) and/or preoriented and/or textured form and which are so selected that the shrinking forces are active, before the reaction resin reaches its gel-phase, and simultaneously shrinking the unimpregnated strands to embed the strands in the resin and hardening the wrapped material in a hardening zone until the resin is completely cured without using a mold and without using further resin impregnation sections and a resin-rich surface is obtained without the need for additional shaping.

2. A process as set forth in claim 1, wherein the impregnated strands are wrapped with braided unimpregnated strands.

3. A process as set forth in claim 1, wherein the impregnated strands are wrapped with unimpregnated strands in a prehardening zone.

4. A process as set forth in claim 1, wherein the unimpregnated strands comprise drawn fibers in filament form.

5. A process as set forth in claim 1, wherein the unimpregnated strands comprise pre-oriented fibers in filament form.

6. A process as set forth in claim 1, wherein the unimpregnated strands comprise textured organic fibers in filament form.

7. A process as set forth in claim 1, wherein the unimpregnated strands comprise monofils.

8. A process as set forth in claim 1, wherein the unimpregnated strands comprise a mixture of organic and inorganic fibers.

9. A process as set forth in claim 1, wherein the unimpregnated strands are wrapped in a helical disposition.

10. A process as set forth in claim 1, wherein at least approximately 12% of the surface of the impregnated strands are wrapped with unimpregnated strands.

11. A process as set forth in claim 1, wherein groups of impregnated strands are impregnated by different impregnating resins.

* * * * *